Sept. 19, 1961 C. K. DAVIS 3,000,396
PRESSURE RELIEF VALVE
Filed Sept. 18, 1957 2 Sheets-Sheet 1

INVENTOR.
CARL K. DAVIS
BY
Clifford L. Sadler
ATTORNEY.

Sept. 19, 1961
C. K. DAVIS
3,000,396
PRESSURE RELIEF VALVE
Filed Sept. 18, 1957
2 Sheets-Sheet 2
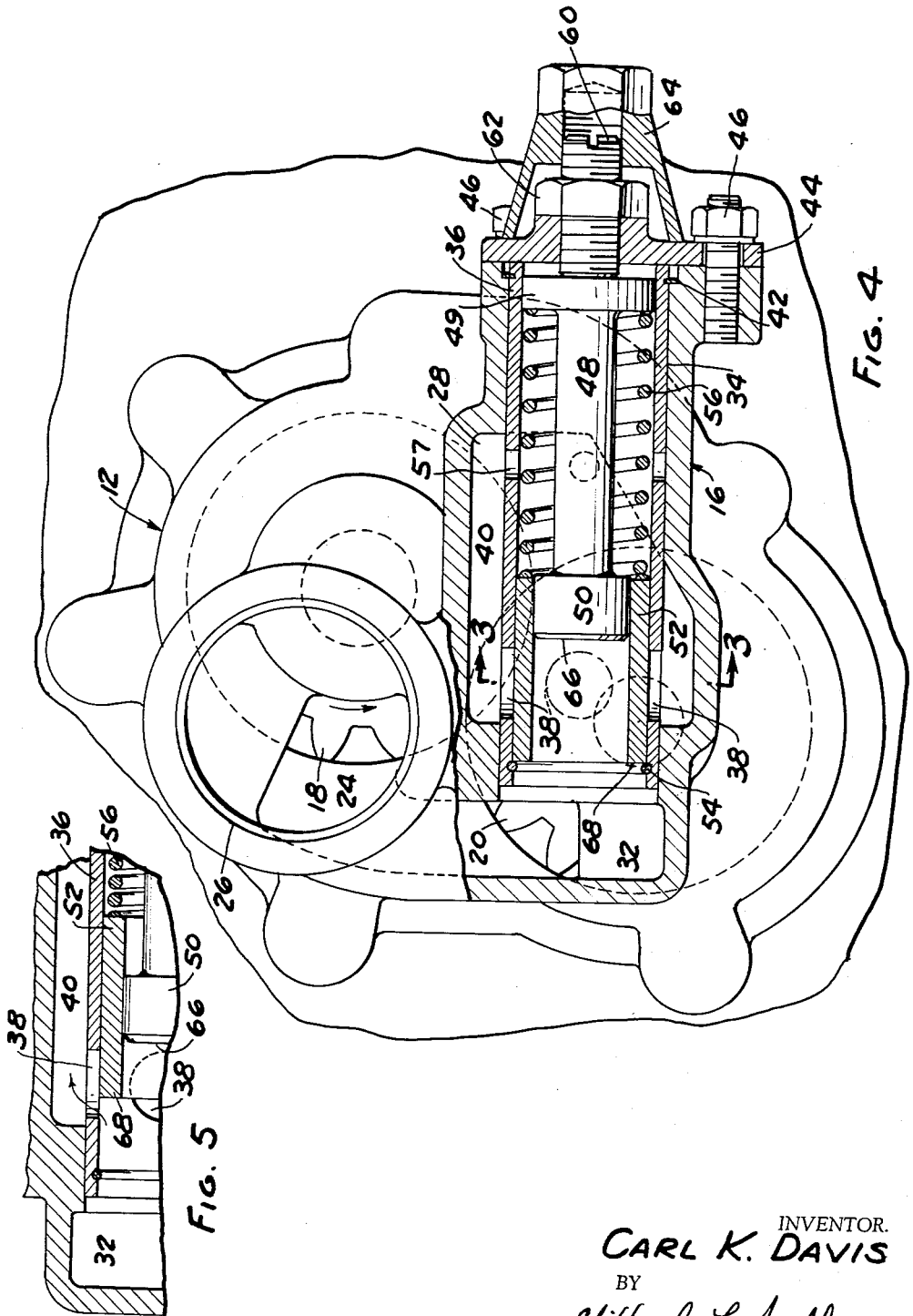
INVENTOR.
CARL K. DAVIS
BY
Clifford L. Sadler
ATTORNEY.

United States Patent Office 3,000,396
Patented Sept. 19, 1961

3,000,396
PRESSURE RELIEF VALVE
Carl K. Davis, 181 S. Wilson Blvd.,
Mount Clemens, Mich.
Filed Sept. 18, 1957, Ser. No. 685,776
1 Claim. (Cl. 137—516.15)
(Filed under Rule 47(b) and 35 U.S.C. 118)

The present invention relates to pressure relief valves for hydraulic systems and more particularly to such a valve having improved sensing characteristics.

In hydraulic systems where pressure relief valves are employed to prevent the creation of excess pressure, it is common to use a spring pressed solid piston as the valve element. However, where pressures are high, an ordinary solid piston is not satisfactory, as a large stiff spring is required to offset the fluid forces which are built up on the face of the piston. Such a spring is difficult to handle in the assembling of the valve and in operation doesn't always give reliable results because of commercial tolerances encountered in heavy stiff springs. A piston of small diameter is not an acceptable alternative as it does not provide sufficient porting.

In view of the above recognized state of the art, it is an object of the present invention to provide a pressure relief valve for a hydraulic system of adequate size which is sensitive to pressure changes and employs a light weight cheap spring. Another object of the present invention is to provide a pressure relief valve for a hydraulic system which can be adjusted to a desired cut-off pressure.

These and further objects of the present invention will become apparent from the following description and the accompanying drawings in which:

FIGURE 4 is a sectional view taken along section lines 4—4 of FIGURE 1; and

FIGURE 5 is an enlarged sectional view of a portion of the valve disclosed in FIGURE 4.

Figure 1:
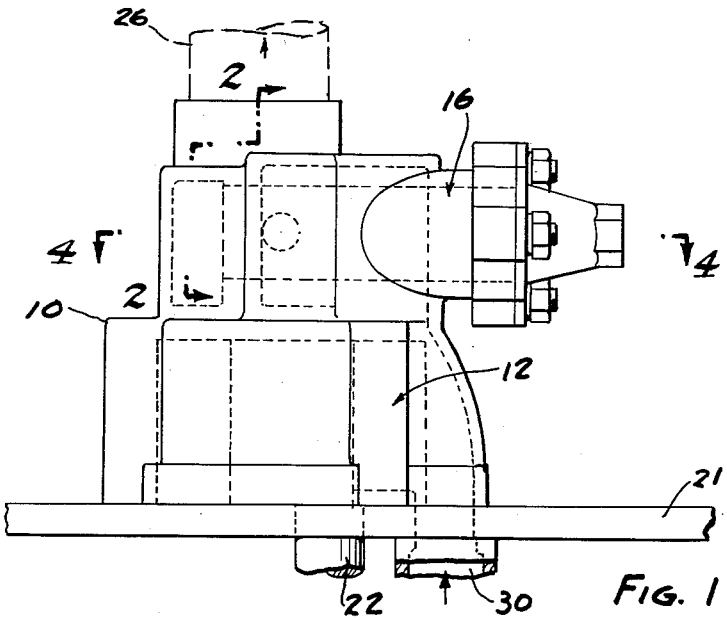
FIGURE 1 is an elevational view of a hydraulic gear pump and a pressure relief valve constructed according to the present invention.
Figures 2, 3:
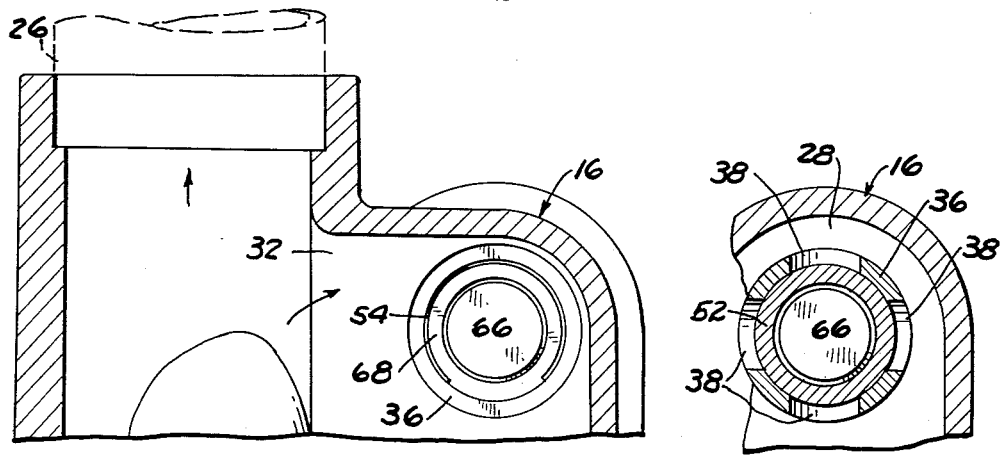
FIGURE 2 is a sectional view taken along section lines 2—2 of FIGURE 1.
FIGURE 3 is a sectional view taken along section lines 3—3 of FIGURE 4.

Referring now to the drawings for a more detailed description of the present invention wherein like reference numerals refer to like parts, a housing 10 having a gear pump portion 12 and a pressure relief valve portion 16 is disclosed. The portion 12 contains a pump of simple spur gear construction having a driving gear 18 and a driven gear 20 which intermesh. The housing portion 12 forms a fluid tight fit about the peripheries of the gears 18 and 20 and on one of their side surfaces. A closure plate 21 seals the remaining gear side surface. The driving gear 18 is driven by a shaft 22 which is connected to a rotating power source not shown. The rotation of the driving gear 18 in a counterclockwise direction as seen in FIGURE 4 causes gear 20 to rotate clockwise tending to pump fluid by the creation of a high pressure zone 24 and a low pressure zone 28 in a well known manner. The high pressure zone 24 of the pump is defined by the meshing gears 18 and 20, the pump housing 12, the plate 21, and an outlet passage 26 which has a branch portion 32 therein for communication with the pressure relief valve. The low pressure zone 28 is similarly defined and has an inlet passage 30.

The valve 16 is formed with a cylindrical bore 34 in the housing 10 which joins the branch passage 32. A cylindrical sleeve 36 is press fitted into the bore 34 and has a plurality of relief ports 38 formed circumferentially spaced apart in the wall thereof near the high pressure branch 32. These passages 38 align with an annular shaped passage 40 cast in the housing 10 in communication with the low pressure side 28 of the pump. Sleeve 36 is restricted from lateral movement by snap ring 42 and a covered plate 44 secured by appropriate means such as bolts 46. Slidably received within the sleeve 36 is a spool shaped spacer 48. The diameter of the spool's outer or right hand end 48 bears against sleeve 36. The diameter of its left or inner end 50 is of lesser size than the sleeve 36 and defines an annular space in which a cylindrical valve element 52 is slidably positioned. Valve element 52 is prevented from lateral movement to the left as viewed in FIGURE 4 by snap ring 54 and is resiliently urged against the ring 54 by a spring 56 disposed between the outer end 49 of the spool 48 and the valve element 52. The valve element 52 forms a seal over the ports 38.

A second series of ports 57 in the sleeve 36 provides an exit to the low pressure side 28 of the pump for any fluid leaked to the area of the spool 48.

The spring 56 also positions the spool 48 against a positioning screw 60 threadably received in a nut 62 that is welded to the cover plate 44. Screw 60 is protected from undesired exterior manipulation by a cover 64. Movement of the set screw 60 in or out will vary the force of the spring 56 against the valve element 52.

In operation, rotation of the gears 18 and 20 creates a hydraulic pressure in zone 24 and branch 32 causing a flow through outlet 26. This pressure acts against the left end face 50 of the spool 48 and against the left end 68 of the annular shaped valve element 52. When this pressure reaches a preset magnitude as determined by the rate of the spring 56 and the location of set screw 60, a condition will occur as disclosed in FIGURE 5 where the pressure against the end of the valve element 52 has caused it to be displaced to the right against the compression of the spring 56. When the element 52 is moved sufficiently, ports 38 will be exposed allowing the pressure fluid to escape into the annular chamber 40 where it returns to the low pressure or inlet side 28 of the pump. This action will continue as long as the excess pressure is maintained. If this bleeding off of the fluid reduces the pressure sufficiently, the spring 56 will force the valve element to close the ports 38. Obviously the opening of the relief ports 38 is dependent upon the magnitude of the pressure in branch 32.

With the present invention the pressure is acting against only the end of the annular shaped valve element 52 which is of substantially lesser area than the total area which would be presented if the valve were a solid plug riding in the cylinder 36. Because this area is reduced, spring 56 need not be of a heavy low rate type but rather can be of a light weight type. The light weight spring results in a pressure relief valve more sensitive to the critical limit of excess pressure.

While the present invention has been disclosed and described in association with specific structure, this has been done for purposes of illustration and not limitation. It is to be understood that variations of the present invention may be made by those skilled in the art and still remain within the scope of the appended claim.

I claim:

A pressure relief valve for a pressure fluid system having high and low pressure zones, said valve comprising a housing having a cylindrical bore, inlet and outlet ports located at one end of said bore and communicating with said high and low pressure zones respectively, a sleeve slidably received within said bore and adapted to seal said outlet ports, a generally spool-shaped member positioned within said bore and having enlarged ends of different diameters, the small end of said spool being slidably received within said sleeve and adapted to seal it against the passage of fluid, a spring disposed between the large end of said spool and one end of said sleeve, means for varying the axial position of said spool relative to said housing to vary the force of said spring on said sleeve, the forward annular edge of said sleeve being exposed to the inlet pressure whereby upon a predetermined inlet pressure the sleeve is moved against the spring resistance to open said outlet ports.

References Cited in the file of this patent

UNITED STATES PATENTS

| | | |
|---|---|---|
| 1,199,616 | Rushton | Sept. 26, 1916 |
| 2,089,417 | Peo | Aug. 10, 1937 |
| 2,415,750 | Melichor | Feb. 11, 1947 |
| 2,472,049 | Schneck | May 31, 1949 |
| 2,630,825 | Stephens | Mar. 10, 1953 |
| 2,742,862 | Banker | Apr. 24, 1956 |
| 2,771,066 | Bischoff | Nov. 20, 1956 |